ID1 United States Patent US 8,964,660 B2
Yang et al. (45) Date of Patent: Feb. 24, 2015

(54) METHOD AND APPARATUS FOR TRANSMITTING ACK/NACK

(75) Inventors: Suck Chel Yang, Anyang-si (KR); Jung Hoon Lee, Anyang-si (KR); Joon Kui Ahn, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 86 days.

(21) Appl. No.: 13/148,054

(22) PCT Filed: May 7, 2010

(86) PCT No.: PCT/KR2010/002905
§ 371 (c)(1),
(2), (4) Date: Aug. 5, 2011

(87) PCT Pub. No.: WO2010/128817
PCT Pub. Date: Nov. 11, 2010

(65) Prior Publication Data
US 2011/0292902 A1    Dec. 1, 2011

Related U.S. Application Data

(60) Provisional application No. 61/176,478, filed on May 7, 2009.

(30) Foreign Application Priority Data

May 3, 2010 (KR) .................. 10-2010-0041265

(51) Int. Cl.
*H04W 72/04* (2009.01)
*H04L 1/16* (2006.01)
*H04L 1/18* (2006.01)
*H04L 5/00* (2006.01)
*H04L 27/26* (2006.01)

(52) U.S. Cl.
CPC ............ *H04L 1/1614* (2013.01); *H04L 1/1854* (2013.01); *H04L 1/1861* (2013.01);
(Continued)

(58) Field of Classification Search
CPC ..... H04W 72/04; H04W 28/26; H04W 84/08; H04W 76/02; H04W 88/08; H04W 76/00; H04L 47/50; H04L 47/622; H04J 3/1682; H04J 3/175; H04J 3/16
USPC .......................... 370/252, 256, 329, 349, 458
See application file for complete search history.

(56) References Cited

U.S. PATENT DOCUMENTS

2008/0080423 A1* 4/2008 Kolding et al. ............... 370/329
2008/0225788 A1 9/2008 Inoue et al.
(Continued)

FOREIGN PATENT DOCUMENTS

KR 10-2008-0084702 A 9/2008
KR 10-2008-0108887 A 12/2008
(Continued)

*Primary Examiner* — Faruk Hamza
*Assistant Examiner* — Jean F Voltaire
(74) *Attorney, Agent, or Firm* — Birch, Stewart, Kolasch & Birch, LLP

(57) ABSTRACT

The present invention is directed to a wireless communication system. Particularly, the present invention is directed to a method and an apparatus of transmitting ACK/NACK (acknowledgement/negative-ACK) signal at a user equipment in a wireless communication system, the method comprising: receiving a plurality of data blocks from a transmitting end; reserving a plurality of PUCCH (physical uplink control channel) resources for transmission of the ACK/NACK signal; mapping ACK/NACK hypothesis for the plurality of the data blocks to a PUCCH resource group including at least two reserved PUCCH resources; and transmitting at least two modulation symbols corresponding to the ACK/NACK hypothesis to the transmitting end via the PUCCH resource group.

18 Claims, 13 Drawing Sheets

(52) U.S. Cl.
CPC ............ *H04L5/0007* (2013.01); *H04L 5/0053* (2013.01); *H04L 5/0055* (2013.01); *H04L 27/2602* (2013.01)
USPC ........................................................ 370/329

(56) References Cited

U.S. PATENT DOCUMENTS

| | | |
|---|---|---|
| 2008/0311942 A1 | 12/2008 | Kim et al. |
| 2009/0092148 A1* | 4/2009 | Zhang et al. ................. 370/458 |
| 2009/0232065 A1* | 9/2009 | Zhang et al. .................. 370/329 |
| 2010/0142475 A1 | 6/2010 | Kim et al. |
| 2010/0173641 A1 | 7/2010 | Kim et al. |
| 2010/0195629 A1* | 8/2010 | Chen et al. .................... 370/336 |
| 2010/0272048 A1* | 10/2010 | Pan et al. ...................... 370/329 |

FOREIGN PATENT DOCUMENTS

| | | |
|---|---|---|
| KR | 10-2008-0110443 A | 12/2008 |
| KR | 10-2009-0028461 A | 3/2009 |

* cited by examiner

Single component carrier (e.g. LTE system)

PUCCH format 1a and 1b structure (normal CP case)

Fig. 10

METHOD AND APPARATUS FOR TRANSMITTING ACK/NACK

CROSS REFERENCE TO RELATED APPLICATIONS

This application is the National Phase of PCT/KR2010/002905 filed on May 7, 2010, which claims priority under 35 U.S.C. 119(e) to U.S. Provisional Application No. 61/176,478 filed on May 7, 2009 and under 35 U.S.C. 119(a) to Patent Application No. 10-2010-0041265 filed in the Republic of Korea on May 3, 2010, all of which are hereby expressly incorporated by reference into the present application.

TECHNICAL FIELD

The present invention relates to a wireless communication system, and more particularly, to a method and apparatus of transmitting ACK/NACK signal.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

DISCLOSURE OF INVENTION

Technical Problem

Accordingly, the present invention is directed to a method and apparatus of transmitting signal, which substantially obviates one or more problems due to limitations and disadvantages of the related art.

An object of the present invention is to provide a method and apparatus of transmitting ACK/NACK (Acknowledgement/Negative-ACK) signal in a wireless communication system.

An object of the present invention is to provide a method and apparatus of multiplexing ACK/NACK signals in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these and other advantages and in accordance with the purpose of the present invention, as embodied and broadly described, a method of transmitting an ACK/NACK (acknowledgement/negative-ACK) signal at a user equipment in a wireless communication system is provided. The method includes receiving a plurality of data blocks from a transmitting side, reserving a plurality of PUCCH (physical uplink control channel) resources for transmission of the ACK/NACK signal, mapping ACK/NACK hypothesis for the plurality of the data blocks to a PUCCH resource group including at least two reserved PUCCH resources, and transmitting at least two modulation symbols corresponding to the ACK/NACK hypothesis to the transmitting side via the PUCCH resource group.

To further achieve these and other advantages and in accordance with the purpose of the present invention, a user equipment used in a wireless communication system is provided. The user equipment includes an RF (radio frequency) unit configured to transceive a radio signal with a transmitting side and a processor connected to the RF unit, the processor configured to process a signal transceived with the transmitting side via the RF unit, the processor receiving a plurality of data blocks from a transmitting side, the processor reserving a plurality of PUCCH (physical uplink control channel) resources for transmission of the ACK/NACK signal, the processor mapping ACK/NACK hypothesis for the plurality of the data blocks to a PUCCH resource group including at least two reserved PUCCH resources, the processor transmitting at least two modulation symbols corresponding to the ACK/NACK hypothesis to the transmitting side via the PUCCH resource group.

Here, each PUCCH resource group may be configured in a manner that PUCCH resources are not overlapped between different PUCCH resource groups.

Here, a part of the reserved PUCCH resources may be used in common over the entire PUCCH resource group. In this case, the number of the reserved PUCCH resources may be smaller than that of the data blocks.

Here, a hamming distance between ACK/NACK hypotheses mapped to different PUCCH resource groups is equal to the number of the data blocks.

Here, a modulation order and a constellation point for each of the modulation symbols are independently determined per each PUCCH resource within the PUCCH resource group.

Here, the PUCCH resource group indicates an ACK/NACK hypothesis group including ACK or NACK for a particular data block among entire ACK/NACK hypotheses and a [modulation symbol, PUCCH resource] pair within the PUCCH resource group indicates an ACK/NACK hypothesis sub-group including ACK/NACK for one or more remaining data blocks except the particular data block within the corresponding ACK/NACK hypothesis group.

Here, a plurality of the data blocks can be received via a plurality of downlink component carriers, a plurality of downlink subframes or both of the downlink component carriers and the downlink subframes. Moreover, the transmission of the ACK/NACK signal can be performed via a specific uplink component carrier only.

It is to be understood that both the foregoing general description and the following detailed description are exemplary and explanatory and are intended to provide further explanation of the invention as claimed.

Advantageous Effects of Invention

According to embodiments of the present invention, ACK/NACK signals can be efficiently transmitted in a wireless communication system. In particular, ACK/NACK signals can be efficiently multiplexed in a wireless communication system.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 9 and FIG. 10 show examples for ACK/NACK multiplexing according to another embodiment of the present invention;

MODE FOR THE INVENTION

Hereinafter, structures, operations, and other features of the present invention will be understood readily by the preferred embodiments of the present invention, examples of which are illustrated in the accompanying drawings. The embodiments of the present invention can be used for various wireless access technologies such as CDMA, FDMA, TDMA, OFDMA, SC-FDMA, and MC-FDMA. The CDMA can be implemented by wireless technology such as universal terrestrial radio access (UTRA) or CDMA2000. The TDMA can be implemented by wireless technology such as global system for mobile communications (GSM)/general packet radio service (GPRS)/enhanced data rates for GSM evolution (EDGE). OFDMA can be implemented by wireless technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA. LTE-advanced (LTE-A) is an evolved version of the 3GPP LTE.

The following embodiments will be described based on that technical features of the present invention are applied to the 3GPP system. However, it is to be understood that the 3GPP system is only exemplary and the present invention is not limited to the 3GPP system.

Figure 1:
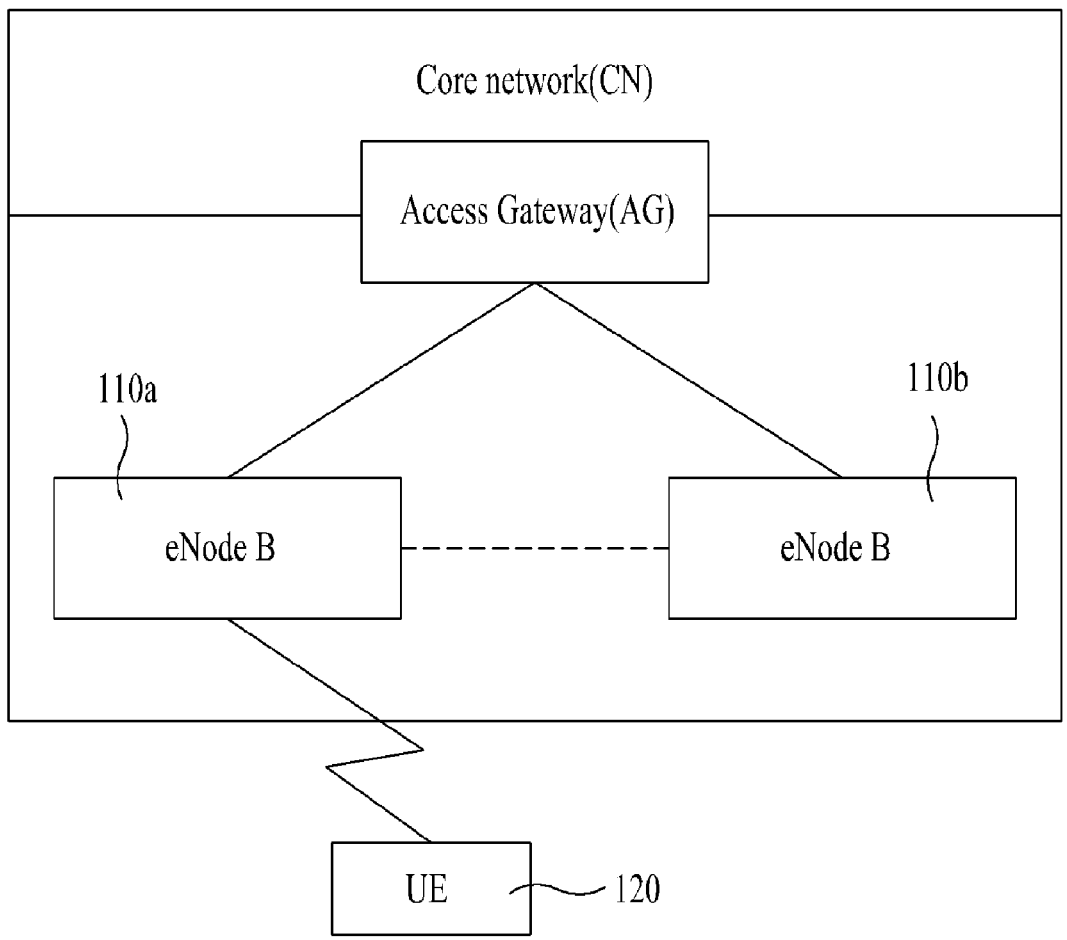
FIG. 1 is a diagram for a network structure of an E-UMTS (evolved universal mobile telecommunications system)

FIG. 1 is a diagram illustrating a network structure of an Evolved Universal Mobile Telecommunications System (E-UMTS). The E-UMTS may be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations can simultaneously transmit multiple data streams for a broadcast service, a multicast service and/or a unicast service. One or more cells may exist for one base station. One cell is set to one of bandwidths of 1.25, 2.5, 5, 10, and 20 Mhz. Different cells may be set to provide different bandwidths. Also, one base station controls data transmission and reception for a plurality of user equipments. The base station transmits downlink (DL) scheduling information of downlink data to a corresponding user equipment to notify the corresponding user equipment of time and frequency domains to which data will be transmitted and information related to encoding, data size, hybrid automatic repeat and request (HARM). Also, the base station transmits uplink (UL) scheduling information of uplink data to the corresponding user equipment to notify the corresponding user equipment of time and frequency domains that can be used by the corresponding user equipment, and information related to encoding, data size, HARQ. A Core Network (CN) may include the AG and a network node for user registration of the UE. The AG manages mobility of a UE on a Tracking Area (TA) basis, wherein one TA includes a plurality of cells.

Figure 2:
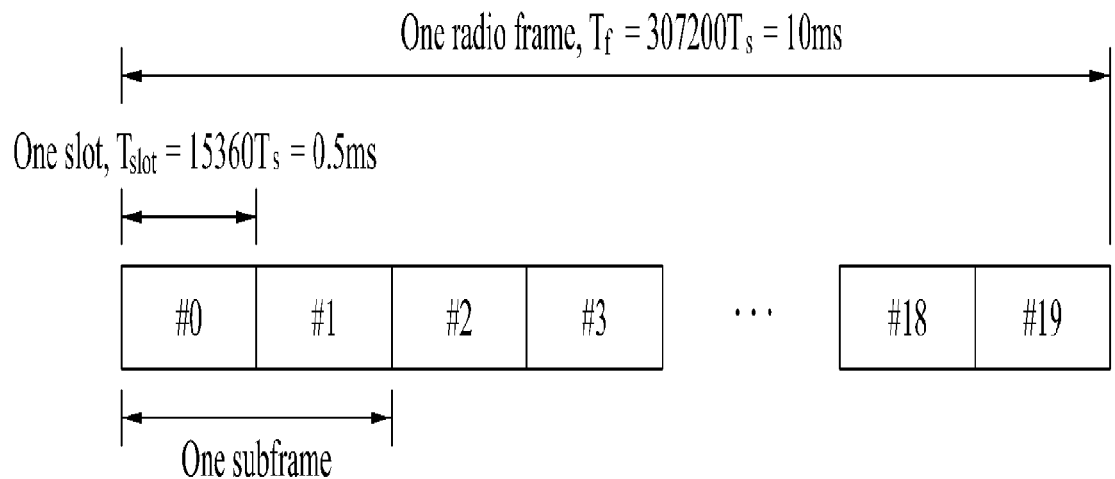
FIG. 2 is an exemplary diagram for a structure of a radio frame used in LTE.

FIG. 2 is a diagram illustrating a structure of a radio frame used in the LTE system.

Referring to FIG. 2, the radio frame has a length of 10 ms($327200*T_s$) and includes 10 subframes of an equal size. Each sub frame has a length of 1 ms and includes two slots. Each slot has a length of 0.5 ms($15360*T_s$). In this case, $T_s$ represents a sampling time, and is expressed by Ts=1/(15 kHz*2048)=$3.2552 \times 10^{-8}$ (about 33 ns). The slot includes a plurality of OFDMA (or SC-FDMA) symbols in a time domain, and includes a plurality of resource blocks (RBs) in a frequency domain. In the LTE system, one resource block includes twelve (12) subcarriers * seven (or six) OFDMA (or SC-FDMA) symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDMA (or SC-FDMA) symbols included in the slot.

Figure 3:
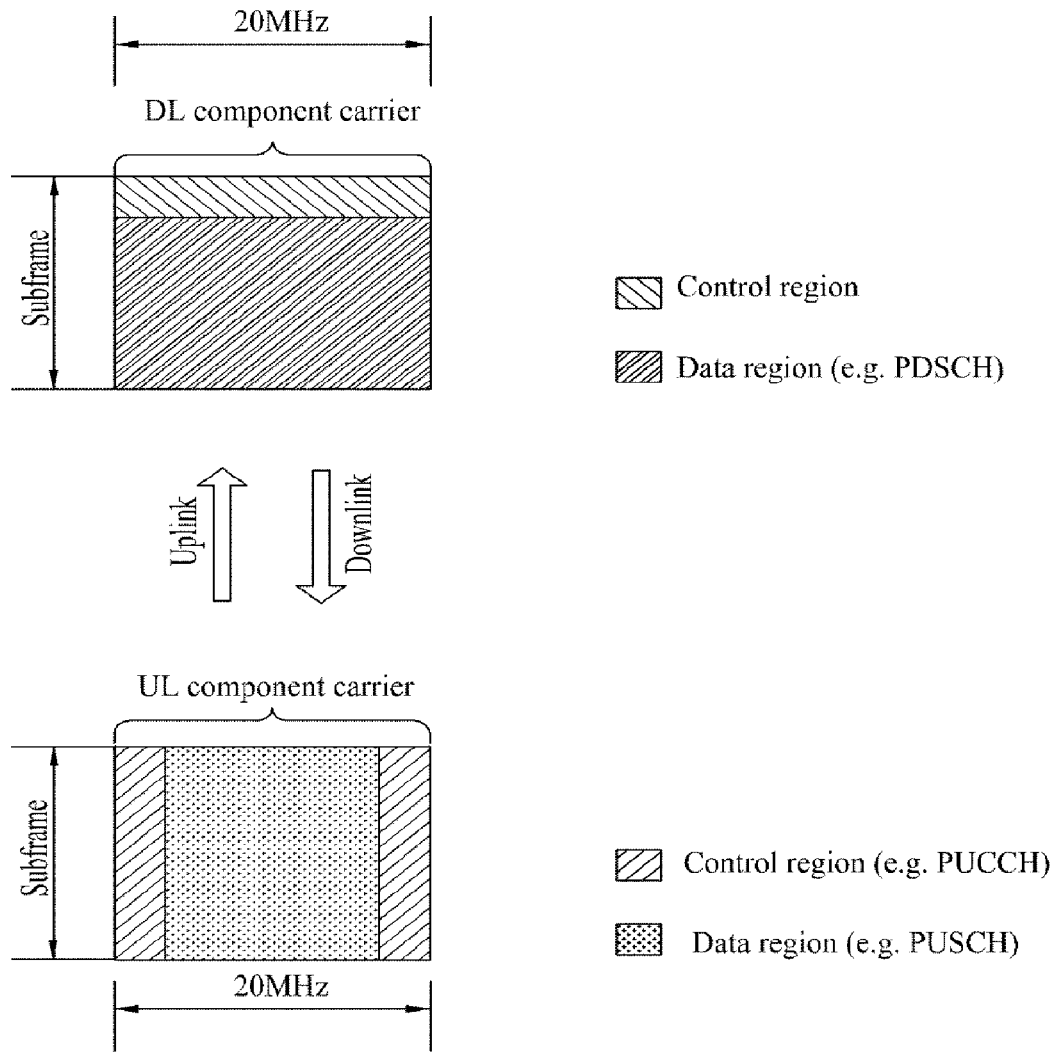
FIG. 3 is an exemplary diagram for a structure of a DL subframe used in LTE.

FIG. 3 is a diagram illustrating an example of communication performed under a single component carrier. FIG. 3 corresponds to a communication example of the LTE system. In the FDD mode, data transmission and reception is performed through one downlink band and one uplink band corresponding to the downlink band. In more detail, in the FDD mode, the radio frame structure of FIG. 2 is used for downlink transmission or uplink transmission only. On the other hand, in the TDD mode, the same frequency band is divided into a downlink interval and an uplink interval corresponding to the downlink interval in the time domain. In more detail, in the TDD mode, the radio frame structure of FIG. 2 is divided for downlink transmission and uplink transmission corresponding to the downlink transmission.

In downlink, control region starts from the first OFDMA symbol of a subframe and includes one or more OFDMA symbol. The size of the control region may be configured independently per subframe. The control region is used to transmit L1/L2 (layer 1/layer 2) control information. Control channel allocated in the control region includes PCFICH (Physical Control Format Indicator CHannel), PHICH (Physical Hybrid-ARQ Indicator CHannel), PDCCH (Physical Downlink Control CHannel).

The PDCCH is allocated in first n OFDMA symbols of a subframe. n is an integer that is the same or more that 1 and is indicated by the PCFICH. The PDCCH is consisting of one or more CCEs. Each CCE includes 9 REGs, where each REG is consisting of four neighbouring resource elements in a state of excluding reference signals. The resource element is a minimum resource unit which is defined as 1 surcarrier by 1 symbol. The PDCCH informed each UE or a group of UEs of information associated with resource allocation of transport channels PCH (Paging channel) and DL-SCH (Downlink-shared channel), uplink scheduling grant, HARQ information, etc. The PCH (Paging channel) and the DL-SCH (Downlink-shared channel) are transmitted through a PDSCH (Physical Downlink Shared Channel). Information indicating to which UE (one or a plurality of UEs) PDSCH data is transmitted and how the UE receive and decode PDSCH data is transmitted in a state of being included in the PDCCH. For example, it is assumed that a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by "B" and "C" in the PDCCH information.

When a data block (e.g., a packet, a transport block) is transmitted in a wireless communication system, an Rx (receiving) node (e.g., a receiving end, a receiver, etc.) should inform a Tx (transmitting) node (e.g., a transmitting end, a transmitter, etc.) of a success/failure of a data block reception. If decoding the data block is successful, the receiver transmits ACK (acknowledgement) to enable the transmitter to transmit a new data block. On the contrary, if the decoding the data block is not successful, the receiver transmits NACK (negative ACK) to enable the transmitter to retransmit the corresponding data block. This operation is called ARQ (automatic repeat request). Meanwhile, HARQ (hybrid ARQ) is a scheme generated from combining ARQ and channel coding together. The HARQ is able to lower an error rate by combining a retransmitted data block with a previously received data block. In the HARQ, ACK/NACK (A/N) is transmitted by physical channel signaling. HARQ implementing methods are mainly classified into a chase combining (CC) scheme and an incremental redundancy (IR) scheme.

Figure 4:
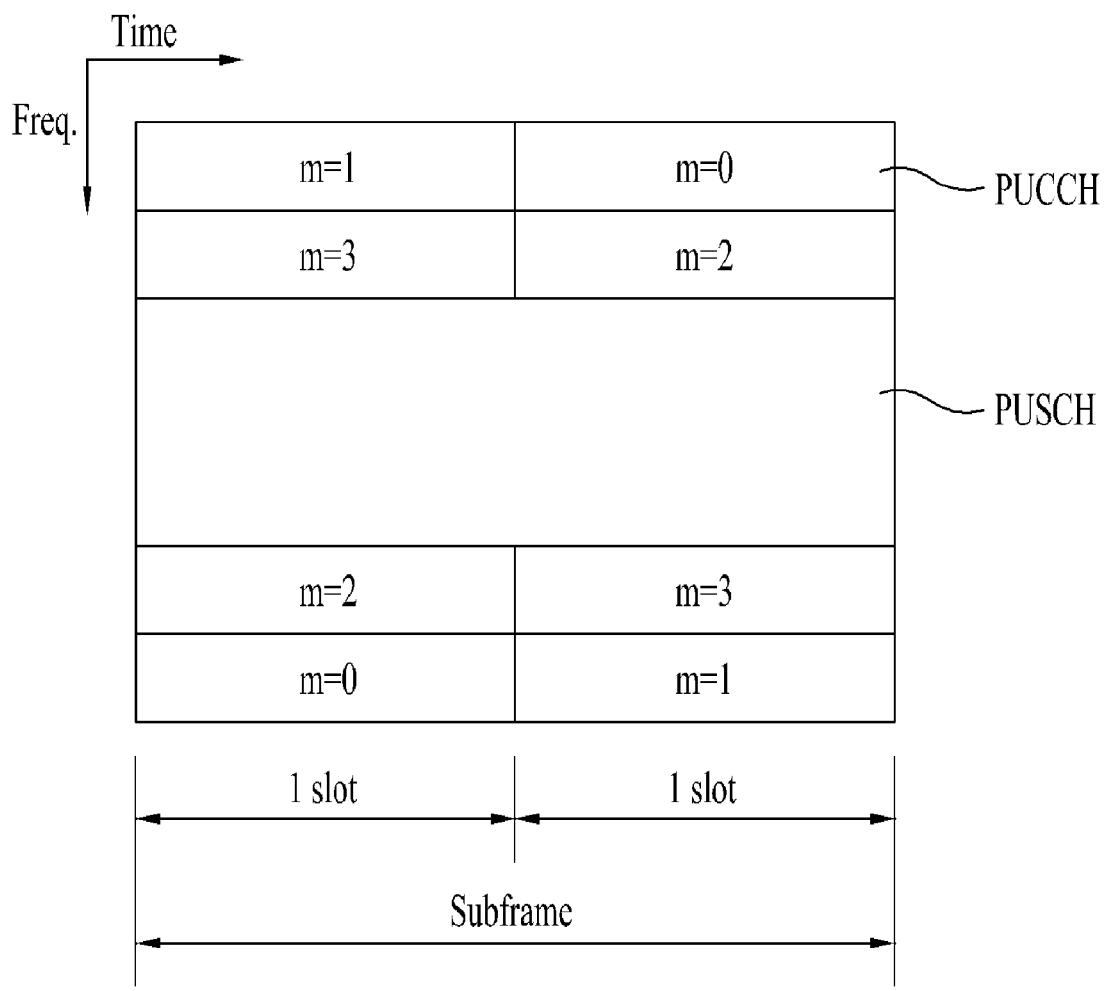
FIG. 4 is an exemplary diagram for a structure of a UL subframe used in LTE.

FIG. 4 is a diagram illustrating a structure of an uplink subframe used in an LTE system.

Referring to FIG. 4, the uplink subframe includes a plurality of slots (for example, two slots). The slot can include a different number of SC-FDMA symbols depending on a CP length. For example, in case of a normal CP, the slot includes seven SC-FDMA symbols. The uplink subframe is divided into a data region and a control region. The data region includes a physical uplink shared channel (PUSCH), and is used to transmit a data signal such as voice. The control region includes a physical uplink control channel (PUCCH), and is used to transmit control information. The PUCCH includes a pair of resource blocks (RBs) (for example, m=0, 1, 2, 3) located at both ends of the data region on the frequency axis, and is hopped using the slot as a boundary. The control information includes HARQ ACK/NACK, channel quality indicator (CQI), precoding matrix index (PMI), and rank index (RI).

Figure 5:
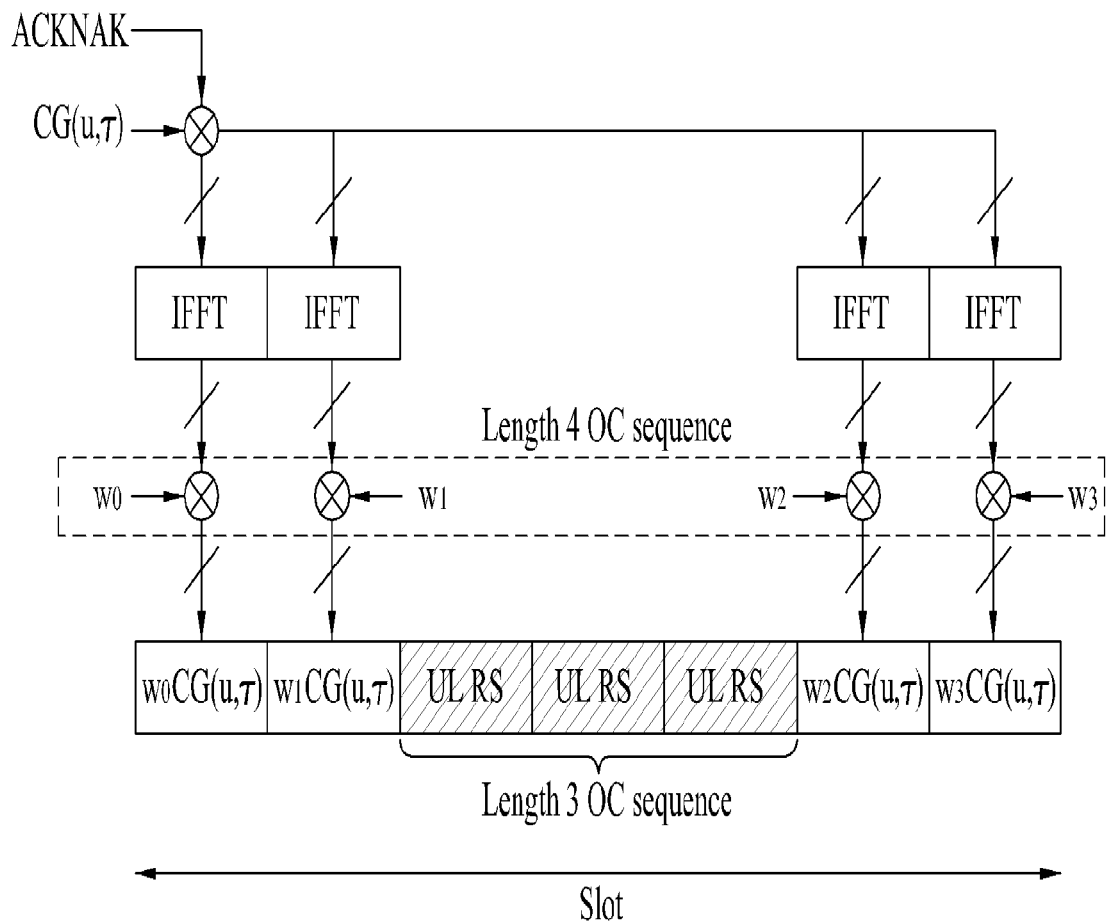
FIG. 5 is an exemplary diagram for a structure of a UL control channel used in LTE.

FIG. 5 is a diagram illustrating a structure of a physical uplink control channel (PUCCH) for transmitting ACK/NACK.

Referring to FIG. 5, in case of a normal cyclic prefix (CP), a reference signal (UL RS) is carried in three continuous symbols located in the center of the slot, and control information (i.e., ACK/NACK signals) is carried in the other four symbols. In case of an extended CP, the slot includes six symbols, wherein a reference signal is carried in the third and fourth symbols. ACK/NACK signals from a plurality of user equipments are multiplexed with one PUCCH resource by using a CDM mode. The CDM mode is implemented using cyclic shift (CS) of frequency spreading and/or (quasi) orthogonal spreading codes for time spreading. For example, ACK/NACK are identified using different cyclic shifts (CS) of computer generated constant amplitude zero auto correlation (CG-CAZAC) sequence (frequency spreading) and/or different walsh/DFT orthogonal codes (time spreading). w0, w1, w2, w3 multiplied after IFFT obtain the same result even though they are multiplied before IFFT. In the LTE system, PUCCH resources for transmitting ACK/NACK are expressed by combination of frequency-time resources (for example, resource block), cyclic shift of sequences for frequency spreading, and (quasi)orthogonal codes for time spreading. Each PUCCH resource is indicated using a PUCCH (resource) index.

Figure 6:
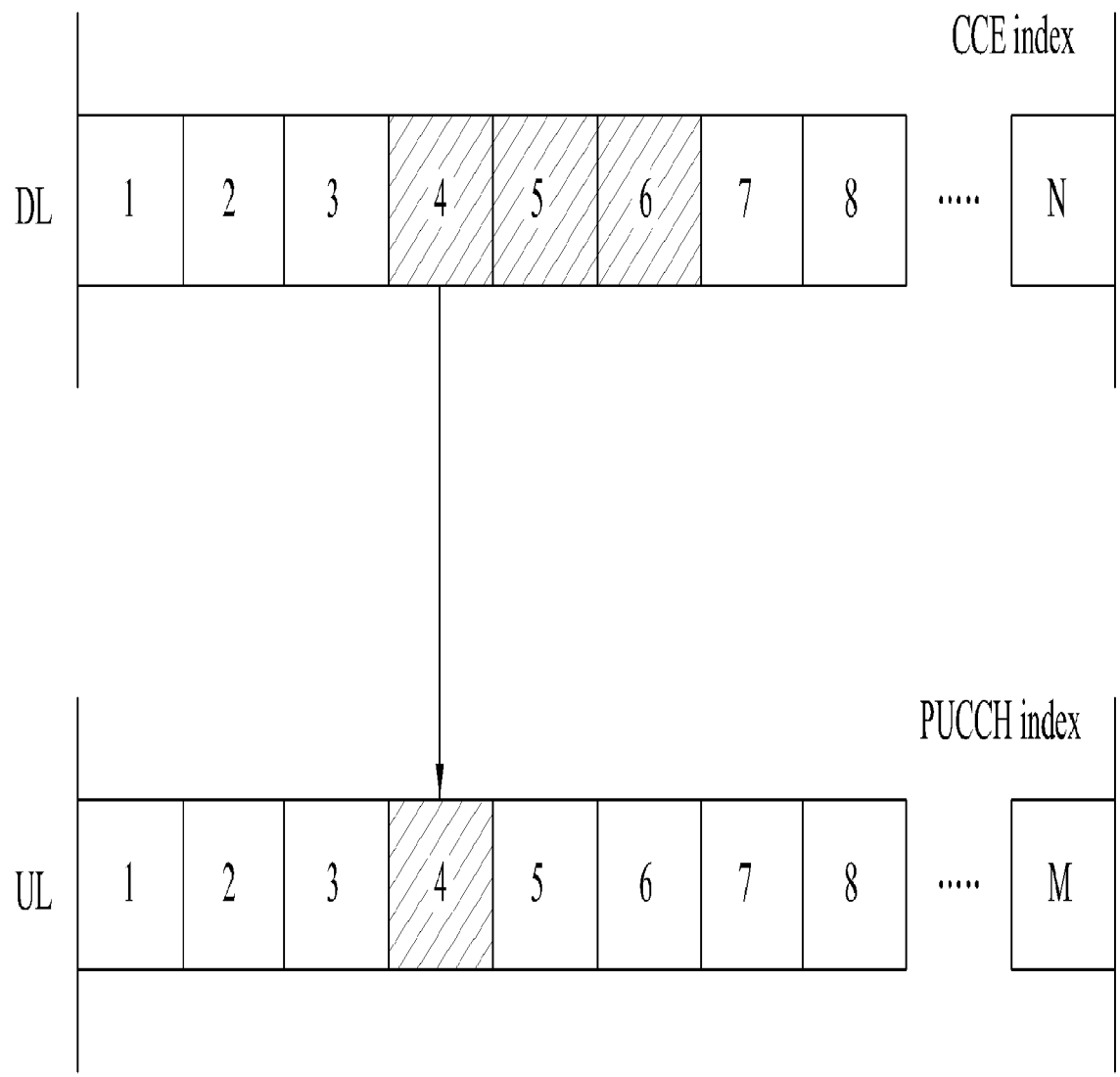
FIG. 6 is an exemplary diagram for correspondent relation between PUCCH and PDCCH for ACK/NACK transmission.

FIG. 6 is a diagram illustrating an example of determining PUCCH resources for ACK/NACK. In the LTE system, PUCCH resources for ACK/NACK are not previously allocated to each user equipment but shared by a plurality of user equipments within a cell per timing point. In more detail, the PUCCH resources used for ACK/NACK transmission correspond to PDCCH carrying scheduling information of corresponding downlink data. In each downlink subframe, an entire region where PDCCH(s) is transmitted includes a plurality of control channel elements (CCEs), and the PDCCH transmitted to the user equipment includes one or more CCEs. The user equipment transmits ACK/NACK through a PUCCH resource corresponding to a specific CCE (for example, first CCE) among CCEs constituting PDCCH received therein.

Referring to FIG. 6, each square block in a downlink (DL CC) represents a CCE, and each square block in an uplink (UL CC) represents a PUCCH resource. Each PUCCH index corresponds to a PUCCH resource for ACK/NACK. It is assumed that information regarding PDSCH information is transferred through a PDCCH that includes CCEs Nos. 4 to 6 as illustrated in FIG. 6. In this case, the user equipment transmits ACK/NACK through PUCCH No. 4 corresponding to CCE No. 4 which is the first CCE of the PDCCH. FIG. 6 illustrates that maximum M number of PUCCHs exist in the UL CC when maximum N number of CCEs exist in the DL CC. Although N may be equal to M (N=M), M may be different from N, and mapping between CCEs and PUCCHs may be overlapped.

In more detail, in the LTE system, PUCCH resource index is defined as follows.

$$n^{(1)}_{PUCCH} = n_{CCE} + N^{(1)}_{PUCCH} \qquad \text{[Equation 1]}$$

In this case, $n^{(1)}_{PUCCH}$ represents a PUCCH resource index for transmitting ACK/NACK, $N^{(1)}_{PUCCH}$ represents a signaling value transferred from an upper layer, and $n_{CCE}$ represents the smallest value of CCE indexes used for PDCCH transmission.

As shown in the equation 1, the PUCCH index for ACK/NACK transmission is decided according to the first CCE used for PDCCH transmission. And then, the RB (Resource Block) index, orthogonal cover index, and cyclic shift value of the PUCCH resource for the actual PUCCH transmission are decided according to the PUCCH index. eNB should reserve PUCCH resources that are equal to the number of CCEs for PDCCH transmission. In case that the number of CCEs for PDCCH transmission is more than 1, the remaining PUCCH indices which are mapped to remaining CCE indices except for the first CCE are not used for actual PUCCH transmission.

Figure 7:
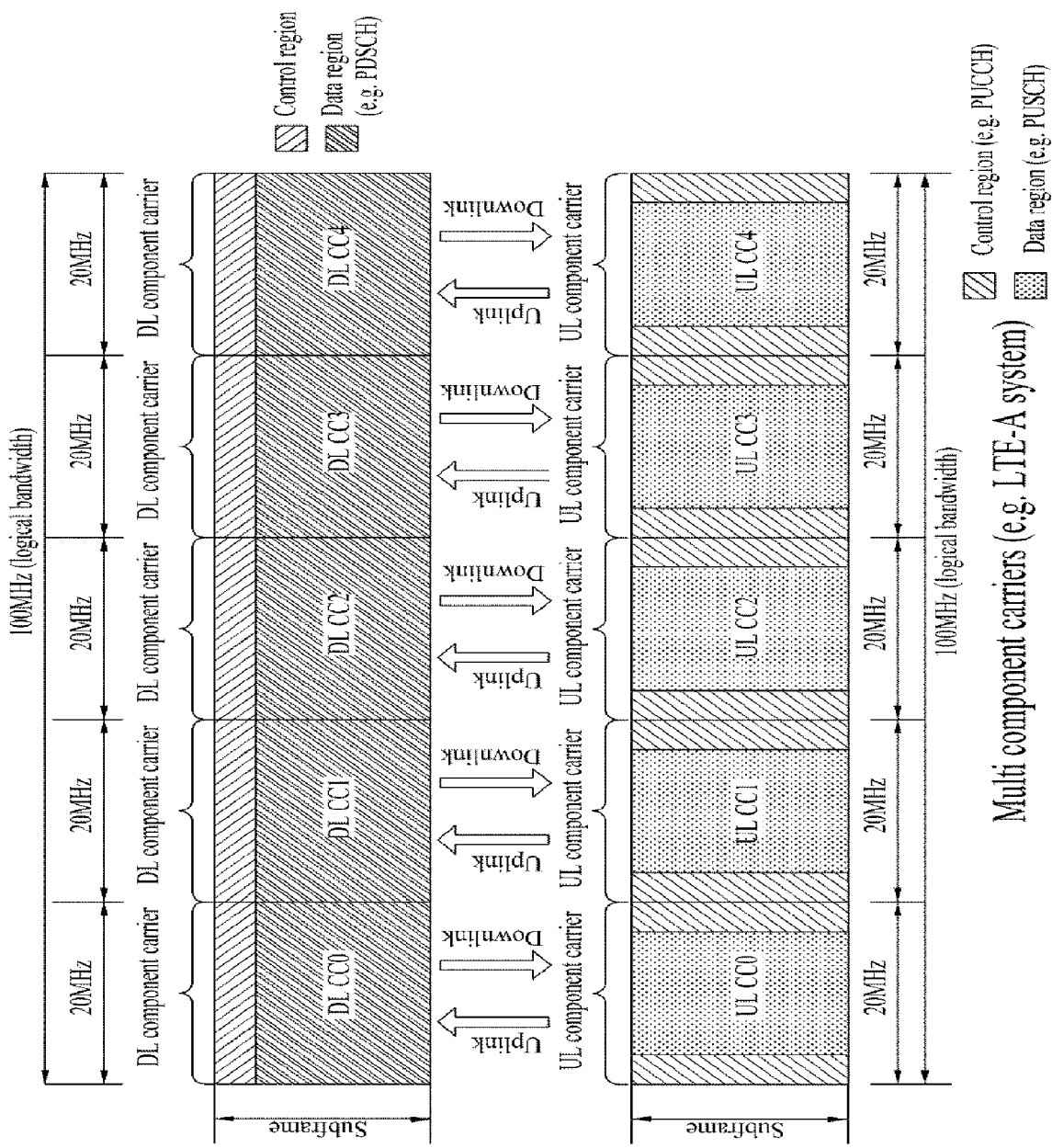
FIG. 7 is a diagram for an example of performing communication in multi-component carrier environment.

FIG. 7 is a diagram illustrating an example of communication performed under multiple component carriers. FIG. 7 corresponds to a communication example of the LTE-A system. The LTE-A system uses carrier aggregation or bandwidth aggregation where a plurality of uplink/downlink frequency blocks are collected to use broader frequency bandwidths, thereby using greater uplink/downlink bandwidths. Each frequency block is transmitted using a component carrier (CC). The CC may mean a frequency block for carrier aggregation or a center carrier of a frequency block depending on the context, wherein the frequency block and the center carrier are used together.

Referring to FIG. 7, five component carriers (CCs) of 20 MHz are collected in the uplink/downlink to support a bandwidth of 100 MHz. The respective CCs may be contiguous or non-contiguous each other in the frequency domain.

FIG. 7 illustrates that a bandwidth of each UL CC is the same as and symmetrical to that of each DL CC. However, the bandwidths of the respective component carriers may be defined independently. For example, the bandwidths of the UL CCs may be configured as 5 MHz (UL CC0)+20 MHz (UL CC1)+20 MHz (UL CC2)+20 MHz (UL CC3)+5 MHz (UL CC4). Also, asymmetrical carrier aggregation where the number of uplink component carriers is different from the number of downlink component carriers may be configured. The asymmetrical carrier aggregation may occur due to a limit of available frequency bandwidth, or may be configured artificially by network establishment. For example, even though N number of CCs are configured in the entire system band, a frequency band that can be used by a user equipment can be limited to M(<N) number of CCs. Various parameters of carrier aggregation can be set in accordance with a cell-specific scheme, a UE group-specific scheme, or a UE-specific scheme.

Although an uplink signal and a downlink signal are illustrated to be transmitted through CCs mapped with each other one to one in FIG. 7, CC through which a signal is actually transmitted may be varied depending on network establishment or signal type. For example, CC through which scheduling command is transmitted may be different from CC through which data are transmitted in accordance with scheduling command. Also, control information associated with DL CC can be transmitted through a specific UL CC regardless of mapping between CCs. Similarly downlink control information can be transmitted through a specific DL CC.

A Tx node can transmit multiple data blocks to a Rx node within a given amount of physical resources and the Rx node transmits the corresponding multiple ACK/NACKs within a given amount of physical resources. Physical resource includes frequency, time, space, code or any combination thereof. As a baseline, we assume the Rx node transmits ACK/NACK(s) corresponding to each data block through a unit ACK/NACK resource. For convenience, the unit ACK/NACK resource is simply referred as ACK/NACK unit. For example, the ACK/NACK unit includes a PUCCH resource for ACK/NACK transmission. For any reason (e.g., asymmetric carrier aggregation, TDD mode, relay backhaul link, etc.), the number of data blocks to be transmitted through one uplink subframe may become large. In this case, the RX node may have to transmit ACK/NACKs through too many number of ACK/NACK units, which makes ACK/NACK transmission/reception complex and may require large amount of total ACK/NACK transmission power. To prevent transmission of too many number of ACK/NACK units and reduce the total ACK/NACK transmission power, following methods can be considered.

ACK/NACK Bundling

With ACK/NACK bundling, ACK/NACK responses for multiple data blocks are combined by logical-AND operation. For example, if the Rx node decodes all the data blocks successfully, Rx node transmits ACK using one ACK/NACK unit. Otherwise, if the Rx node fails in decoding (or detecting) any of the data blocks transmitted the RX node may either transmits NACK using one ACK/NACK unit or transmits nothing for ACK/NACK.

ACK/NACK Multiplexing

With ACK/NACK multiplexing, contents of the ACK/NACK responses for multiple data blocks are identified by the combination of the ACK/NACK unit used in actual ACK/NACK transmission and the contents of the transmitted ACK/NACK. For example, if we assume one ACK/NACK unit carries two bits and two data blocks can be transmitted in maximum (here we assume HARQ operation for each data block can be managed by single ACK/NACK bit), The ACK/NACK result can be identified at the Tx node as in the following table 1.

TABLE 1

| HARQ-ACK(0), HARQ-ACK(1) | $n^{(1)}_{PUCCH}$ | b(0), b(1) |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

In table 1, HARQ-ACK(i) indicates the ACK/NACK result for the data block i. DTX (Discontinuous Transmission) indicates that there is no data block transmitted for corresponding HARQ-ACK(i) or the RX node doesn't detect the existence of the data block corresponding to HARQ-ACK(i). NACK/DTX indicates that NACK and DTX are coupled each other. That is, NACK/DTX indicates only that ACK/NACK result is either NACK or DTX. $n^{(1)}_{PUCCH,X}$ indicates the ACK/NACK unit which should be used in actual ACK/NACK transmission, where there are two ACK/NACK units, $n^{(1)}_{PUCCH,0}$ and $n^{(1)}_{PUCCH,1}$ in maximum. b(0),b(1) indicates two bits carried by the selected ACK/NACK unit. For example, if the Rx node receives and decodes two data blocks successfully, the Rx node should transmit two bits, (1, 1), using ACK/NACK unit $n^{(1)}_{PUCCH,1}$. For another example, if the Tx node transmits two data blocks but the RX node fails in decoding (or misses) the first data block (corresponding to HARQ-ACK(0)) and decodes the second data block (corresponding to HARQ-ACK(1)) successfully, the RX node should transmit (1, 0) using $n^{(1)}_{PUCCH,1}$. By linking the actual ACK/NACK contents with the combination of ACK/NACK unit selection and the actual bit contents in the transmitted ACK/NACK unit in this way, ACK/NACK transmission using single ACK/NACK unit for multiple data blocks is possible. The example above referring to the table 1 can be extended to the ACK/NACK transmission for more than 2 data blocks in natural way.

When the maximum number of data blocks which can be transmitted within a given physical resource is large, applying ACK/NACK bundling or ACK/NACK multiplexing over all the data blocks may lead to too much complexity and/or complex error cases which should be handled. Therefore, limitations or combinations of ACK/NACK transmission schemes are desirable when the maximum number of data blocks is large. In the following description, an ACK/NACK transmitting scheme according to an embodiment of the present invention is explained with reference to the accompanying drawings.

In this disclosure, an ACK/NACK result (or response) indicates ACK or NACK for each data block. In addition, the ACK/NACK result can indicate DTX or NACK/DTX. The ACK/NACK result can include a single bit or a plurality of bits based on a presence or non-presence of SDMA (spatial division multiple access) transmission. Meanwhile, in this specification, an ACK/NACK signal indicates a physical signal carried on a physical channel. Unless mentioned otherwise, an ACK/NACK result, an ACK/NACK response or an ACK/NACK signal can be simply called ACK/NACK and can be mixed with each other in use according to a context.

For clarity and convenience of the following description, an embodiment of the present invention is explained mainly focused on a method of multiplexing a plurality of ACK/NACKs in case that a user equipment receives a plurality of data blocks from a base station (or a relay). Besides, a data block decoding process, an ACK/NACK generating/transmitting process, an initial transmission/retransmission process according to ACK/NACK and the like can be performed by general methods.

In case of ACK/NACK multiplexing, if the maximum number of data blocks transmittable within a given amount of physical resources is incremented higher, ACK/NACK hypotheses required for ACK/NACK multiplexing can exponentially increase. If the number of data blocks and the number of corresponding ACK/NACK units are represented as N and $N_A$, respectively, the number of ACK/NACK hypotheses required for ACK/NACK multiplexing amounts to 2N despite that DTX is excluded. Meanwhile, referring to Table 1, in case of applying a single ACK/NACK unit selection, maximum 4NA ACK/NACK hypotheses can be supported only. In particular, as the number of data blocks is incremented higher, the single ACK/NACK unit selection needs relatively more ACK/NACK units. This increases overhead of a control channel resource required for transmitting a signal for multiple ACK/NACK. For instance, when maximum 5 data blocks (N=5) are transmitted, the number of ACK/NACK hypotheses required for the ACK/NACK multiplexing is 2N=32 (=$4N_A$). Hence, 8 ACK/NACK units ($N_A$=8) should be available for the ACK/NACK transmission.

In order to efficiently perform the ACK/NACK transmission to cope with multiple data block transmission, the present invention proposes an ACK/NACK multiplexing method based on multiple ACK/NACK unit selection. According to the present invention, since a combination of ACK/NACK units selected from a plurality of reserved ACK/NACK units can be used as a resource for identifying or transmitting ACK/NACK hypothesis, it is able to support more ACK/NACK hypotheses by avoiding additional control signaling overhead. This is explained in detail with reference to the drawings as follows.

Figure 8:
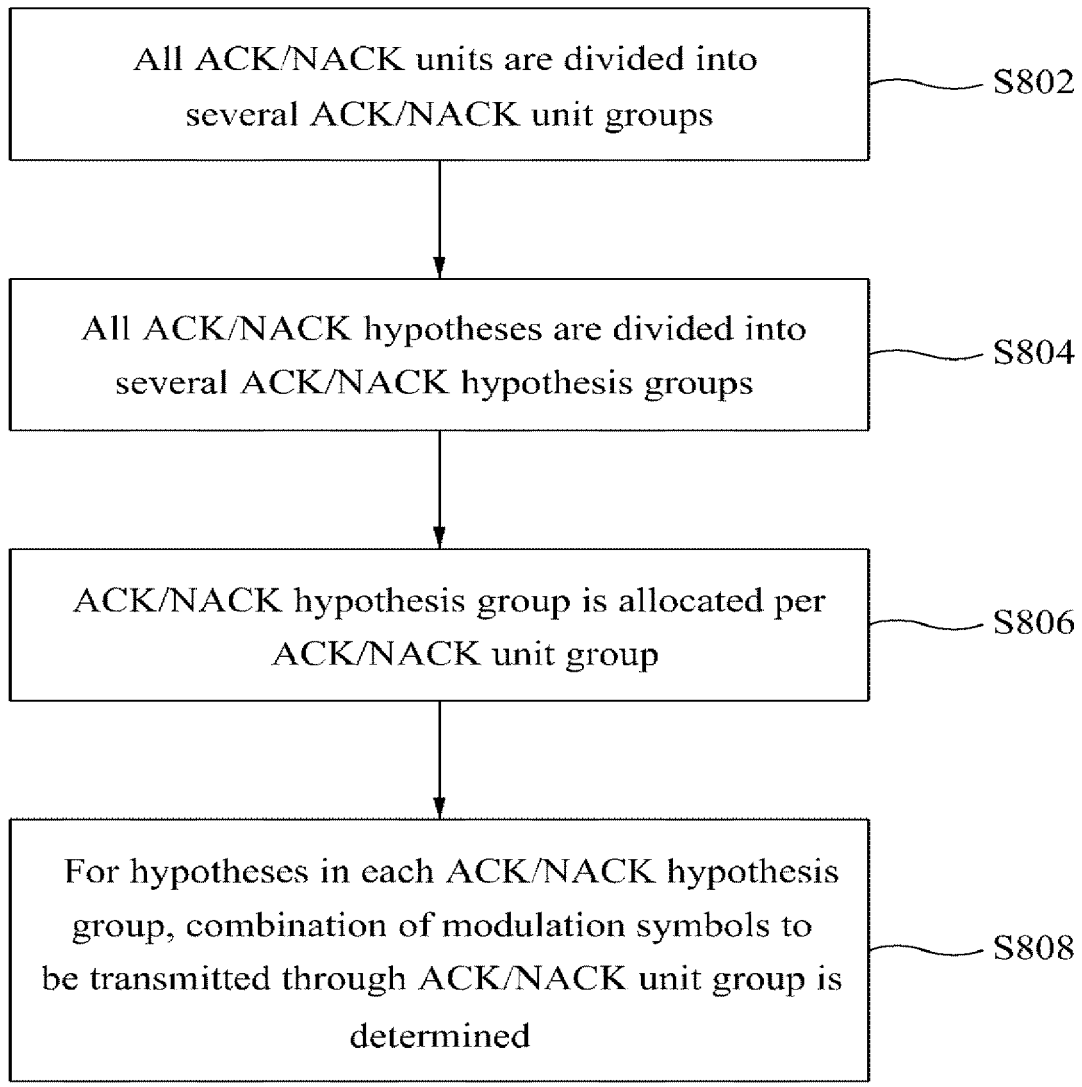
FIG. 8 shows an example for a method of performing ACK/NACK multiplexing according to one embodiment of the present invention.

FIG. 8 shows an example for a method or criterion for performing ACK/NACK multiplexing based on multiple ACK/NACK unit selection according to one embodiment of the present invention. To help the understanding of the present invention, FIG. 8 sequentially illustrates an embodiment of the present invention, by which a time sequence of performing the embodiment of the present invention and the like are non-limited. According to an implementation type, an embodiment of the present invention is implemented as a table according to FIG. 8 and can be executed with reference to the implemented table.

Referring to FIG. 8, entire ACK/NACK units available for ACK/NACK transmission are divided into a plurality of ACK/NACK unit groups [S802]. Each of the ACK/NACK unit groups includes a plurality of ACK/NACK units (e.g., 2 ACK/NACK units). The ACK/NACK units may be orthogonal to or weakly correlated to each other in a region of frequency, time, space, code or the like. The entire available ACK/NACK units can be automatically reserved according to a preset rule (e.g., Formula 1) by corresponding to data blocks (e.g., PDSCH) or a control channel (e.g., PDCCH) for scheduling the data block. The number $N_A$ of the entire available ACK/NACK units can be set equal to the number N of the data blocks. For the resource efficiency, number $N_A$ of the entire available ACK/NACK units can be set smaller than the number N of data blocks. According to the present embodiment, since the number of ACK/NACK units required for ACK/NACK multiplexing does not exceed the number of data blocks ($N_A \leq N$), control resource overhead required for multiple ACK/NACK transmission does not increase rather than single ACK/NACK unit selection.

Meanwhile, the ACK/NACK units included in each of the ACK/NACK unit group are set not to be overlapped between the ACK/NACK unit groups or can be set to be overlapped in part. In particular, the ACK/NACK unit group may include group-dedicated ACK/NACK units only or may include group-dedicated ACK/NACK units and group-shared ACK/NACK units. Preferably, each of the ACK/NACK unit groups is exclusively configured to enable the ACK/NACK units to avoid being overlapped with each other. In case that the ACK/NACK units are configured not to be overlapped with each other between the ACK/NACK unit groups, compared to a case that the ACK/NACK unit is partially shared in the entire ACK/NACK unit groups, a correlation value of a received ACK/NACK signal is less ambiguous. Therefore, ACK/NACK detection complexity in a receiving side can be reduced.

Besides, ACK/NACK hypotheses can be allocated per ACK/NACK unit group in a direction of reducing ACK/NACK errors in consideration of separation of resources that carry ACK/NACK signals, respectively. In particular, entire ACK/NACK hypotheses (a plurality of ACK/NACK hypotheses) can be divided into a plurality of ACK/NACK hypothesis groups, e.g., ACK/NACK hypothesis groups that inducing a number of ACK-to-NACK errors or NACK-to-ACK errors in case of group misunderstanding [S804]. If ACK and NACK are regarded as a bit value '1' and a bit value '0', respectively, the ACK/NACK hypothesis groups can be interpreted as groups having a large ACK/NACK hamming distance in-between. Therefore, the ACK/NACK hypothesis group can be set to have a largest hamming distance between groups for example. Namely, ACK/NACK hypotheses belonging to different ACK/NACK hypothesis groups can be set to have a largest hamming distance between corresponding ACK/NACK hypotheses. The hamming distance increases by 1 if ACK/NACK results at corresponding positions in two ACK/NACK hypotheses are different from each other. Moreover, the hamming distance can be regarded as the number of data blocks having the different ACK/NACK results in two ACK/NACK hypotheses. For example of one implementation, when an ACK/NACK hypothesis is represented as a bit sequence (ACK/NACK bit sequence) indicating an ACK/NACK result, an ACK/NACK hypothesis group can be divided according to a bit value at a specific position in the ACK/NACK bit sequence. For instance, an ACK/NACK hypothesis group can be identified according to whether a most significant bit (MSB) of an ACK/NACK bit sequence is set to 0 or 1. If the number of necessary ACK/NACK hypothesis groups is equal to or greater than 3, an ACK/NACK hypothesis group can be identified using a plurality of bit values in an ACK/NACK bit sequence. The number of ACK/NACK hypothesis groups can be set equal to that of ACK/NACK unit groups.

Once the ACK/NACK unit groups and the ACK/NACK hypothesis groups are set, the ACK/NACK hypothesis group is allocated per the ACK/NACK unit group [S806]. Therefore, the ACK/NACK hypotheses belonging to one of the ACK/NACK hypothesis groups are transmitted via the same ACK/NACK unit group. As such, the ACK/NACK hypotheses are divided into groups having a largest hamming distance for example and the ACK/NACK unit group is allocated per the group, thereby it is able to avoid the worst case of scenario of ACK-to-NACK or NACK-to-ACK error. Afterwards, the ACK/NACK hypotheses belonging to the ACK/NACK hypothesis group can be identified using a modulation symbol carried on the ACK/NACK unit group [S808]. A modulation order [e.g., BPSK (binary phase shift keying), QPSK (quadrature phase shift keying), n-PSK (n-phase shift keying, n-QAM (quadrature amplitude modulation)] and constellation point of the modulation symbol carried on each of the ACK/NACK units in one ACK/NACK unit group can be independently selected per the ACK/NACK unit. Preferably, the modulation order and constellation point of the modulation symbol carried on each ACK/NACK unit can be selected in a manner that a hamming distance between the ACK/NACK hypotheses is considerably large. In particular, the modulation order and constellation point of the modulation symbol for each of the ACK/NACK hypotheses within the ACK/NACK hypothesis group are determined per ACK/NACK unit based on the ACK/NACK hamming distance, whereby worse error cases can be further reduced. In this case, the ACK/NACK hypotheses within the ACK/NACK hypothesis group may be divided into a plurality of ACK/NACK hypothesis sub-group and each ACK/NACK hypothesis subgroup can be indicated by a [modulation symbol, ACK/NACK unit] pair. In particular, the PUCCH resource group may indicate an ACK/NACK hypothesis group including ACK or NACK for a particular data block among entire ACK/NACK hypotheses, and a [modulation symbol, PUCCH resource] pair within the PUCCH resource group may indicate an ACK/NACK hypothesis sub-group including ACK/NACK for one or more remaining data blocks except the particular data block within the corresponding ACK/NACK hypothesis group.

Figure 9:
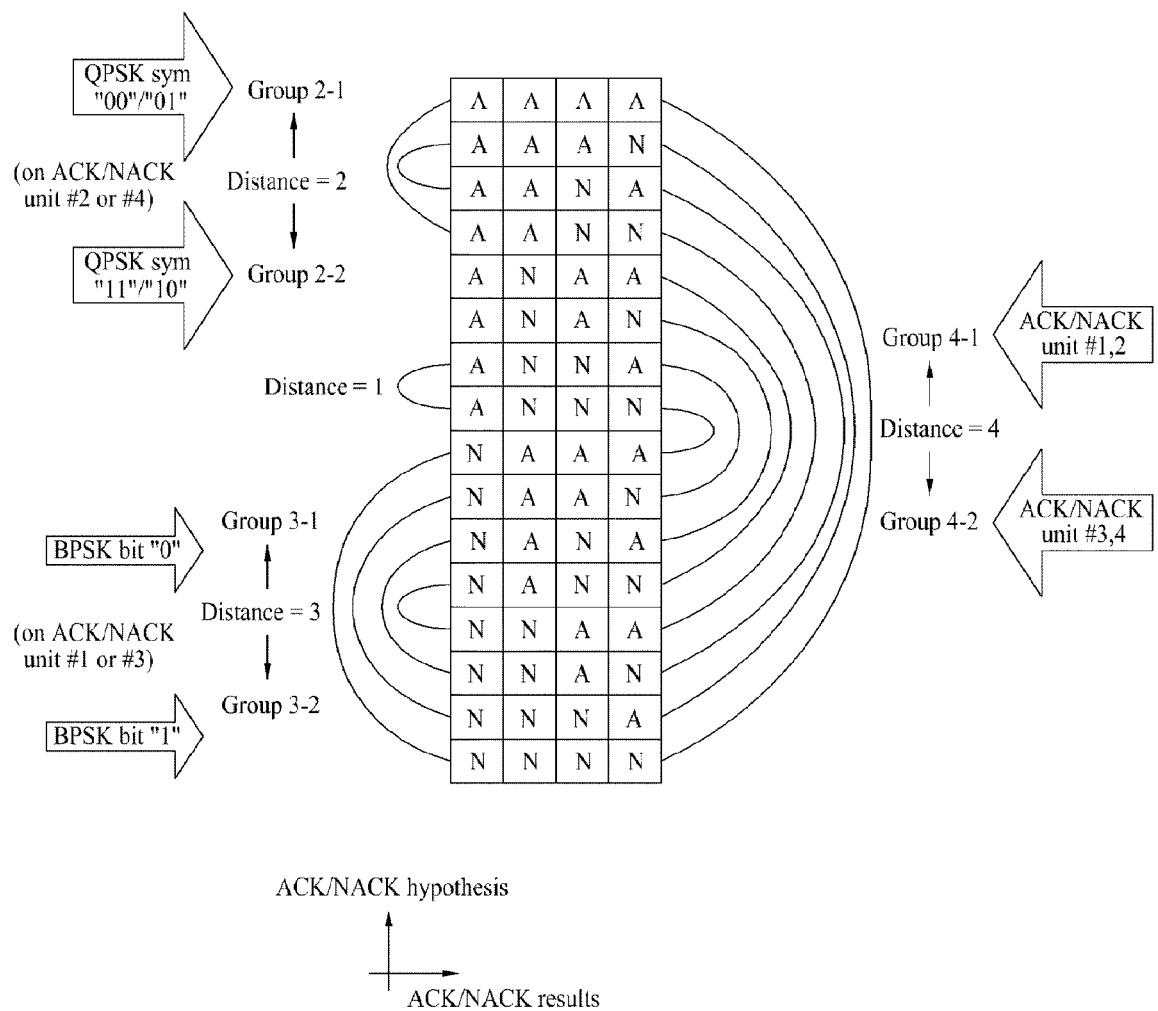
Figure 10:
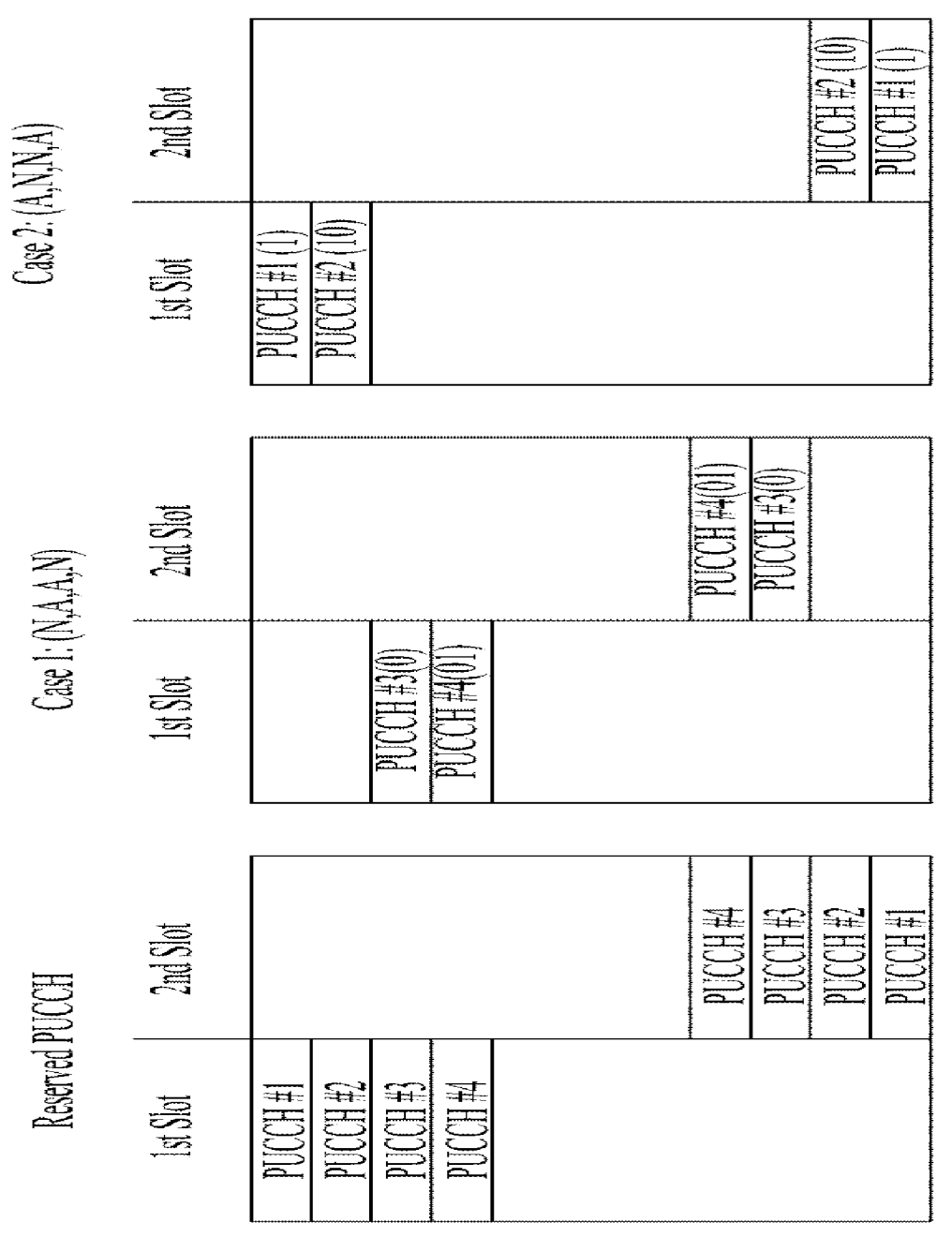

FIG. 9 and FIG. 10 show examples for ACK/NACK multiplexing in case of '$N_A=N=4$' according to another embodiment of the present invention. To help the understanding of the present embodiment, the DTX case in ACK/NACK hypothesis is not taken into consideration. Yet, the present example is applicable to the case of including the DTX in the same manner.

Referring to FIG. 9, total 16 ACK/NACK hypotheses are divided into 2 ACK/NACK hypothesis groups (Group 4-1 and Group 4-2). According to the present embodiment, the ACK/NACK hypothesis group 4-1 and the ACK/NACK hypothesis group 4-2 are divided to have a largest hamming distance '4' in-between. In particular, total 16 ACK/NACK hypotheses include 8 ACK/NACK hypothesis pairs, each of which has a hamming distance set to 4. One (e.g., AAAA) of the ACK/NACK hypothesis pair (e.g., AAAA-NNNN) is identified as the ACK/NACK hypothesis group 4-1, while the other (e.g., NNNN) is identified as the ACK/NACK hypothesis group 4-2. The ACK/NACK hypothesis pairs, each of which has a hamming distance set to 4, include AAAA-NNNN, AAAN-NNNA, AANA-NNAN, AANN-NNAA, ANAA-NANN, ANAA-NANN, ANAN-NANA, ANNA-NAAN and ANNN-NAAA. Subsequently, ACK/NACK units #1 and #2 and ACK/NACK units #3 and #4 are allocated to the ACK/NACK hypothesis group 4-1 and the ACK/NACK hypothesis group 4-2, respectively.

Moreover, 8 ACK/NACK hypotheses within an ACK/NACK hypothesis group 4-X (where, X=1, 2) can be divided into 2 sub-groups (Group 3-1 and Group 3-2). According to the present embodiment, the ACK/NACK hypothesis group 3-1 and the ACK/NACK hypothesis group 3-2 are divided in a manner that a hamming distance between the ACK/NACK hypotheses corresponding to each other is set to 3. In a manner similar to that of the former case, 8 ACK/NACK hypotheses within the ACK/NACK hypothesis group 4-X (X=1, 2) include 4 ACK/NACK hypothesis pairs, each of which hamming distance is set to 3. One (e.g., NAAA) of the ACK/NACK hypothesis pair (e.g., NAAA-NNNN) is identified as the ACK/NACK hypothesis subgroup 3-1, while the other (e.g., NNNN) is identified as the ACK/NACK hypothesis group 3-2. 4 ACK/NACK hypothesis pairs having the hamming distance set to 3 in the ACK/NACK hypothesis group 4-1 include AAAA-ANNN, AAAN-ANNA, AANA-ANAN and AANN-ANAA. Moreover, 4 ACK/NACK hypothesis pairs having the hamming distance set to 3 in the ACK/NACK hypothesis group 4-2 include NAAA-NNNN, NAAN-NNNA, NANA-NNAA and NANN-NNAA. ACK/NACK hypothesis sub-group 3-X (X=1, 2) can correspond to one of BPSK bits {0, 1} and the corresponding BPSK bit value can be transmitted via ACK/NACK unit of a specific order (e.g., first) in the ACK/NACK unit group. For instance, since 'AAAA' belongs to ACK/NACK hypothesis group 4-1? ACK/NACK hypothesis sub-group 3-1, it is able to transmit BPSK bit '0' via ACK/NACK unit #1.

Finally, 4 ACK/NACK hypotheses within an ACK/NACK hypothesis sub-group 3-X (where, X=1, 2) can be divided into 2 sub-groups (Group 2-1 and Group 2-2). According to the present embodiment, the ACK/NACK hypothesis group 2-1 and the ACK/NACK hypothesis group 2-2 are divided in a manner that a hamming distance between the ACK/NACK hypotheses corresponding to each other is set to 2. In a manner similar to that of the former case, 4 ACK/NACK hypotheses within the ACK/NACK hypothesis group 3-X (X=1, 2) include 2 ACK/NACK hypothesis pairs, each of which hamming distance is set to 2. One (e.g., AAAA) of the ACK/NACK hypothesis pair (e.g., AAAA-AANN) is identified as the ACK/NACK hypothesis subgroup 2-1, while the other (e.g., AANN) is identified as the ACK/NACK hypothesis group 2-2. For instance, in case of the ACK/NACK hypothesis group 4-1, 2 ACK/NACK hypothesis pairs having the hamming distance set to 2 in the ACK/NACK hypothesis sub-group 3-1 include AAAA-AANN and AAAN-AANA. And, 2 ACK/NACK hypothesis pairs having the hamming distance set to 2 in the ACK/NACK hypothesis sub-group 3-2 include ANAA-ANNN and ANAN-ANNA. In case of the ACK/NACK hypothesis group 4-2, 2 ACK/NACK hypothesis pairs having the hamming distance set to 2 in the ACK/NACK hypothesis sub-group 3-1 include NAAA-NANN and NAAN-NANA and 2 ACK/NACK hypothesis pairs having the hamming distance set to 2 in the ACK/NACK hypothesis sub-group 3-2 include NNAA-NNNN and NNAN-NNNA. ACK/NACK hypothesis sub-group 2-X (X=1, 2) can correspond to one of QPSK symbol pairs {00/01, 11/10} and the corresponding QPSK symbol value can be transmitted via a remaining ACK/NACK unit (e.g., a second ACK/NACK unit) in the ACK/NACK unit group. Each QPSK symbol can be determined in a manner that 2 ACK/NACK hypotheses having a hamming distance set to 2 can have a maximum distance (i.e., a diagonal line) (e.g., '00' and '11') in the constellation.

FIG. 10 shows an example for transmitting ACK/NACK hypothesis using a plurality of ACK/NACK units according to the method shown in FIG. 9. Referring to FIG. 10, in case that a user equipment receives 4 data blocks from a base station, 4 PUCCH resources PUCCH#1 to PUCCH#4 can be reserved based on PDSCH for each of the data blocks (or PDCCH for scheduling the PDSCH). For clarity, FIG. 10 exemplarily illustrates that the ACK/NACK hypotheses for the 4 data blocks include (N,A,A,N) and (A,N,N,A). Referring to the example shown in FIG. 9, since (N,A,A,N) corresponds to a second ACK/NACK hypothesis of the ACK/NACK hypothesis group 4-2→3-1→2-1, (BPSK '0', QPSK '01') is transmitted for (N,A,A,N) via ACK/NACK units #3 and #4 [Case 1 shown in FIG. 10]. Similarly, since (A,N,N,A) corresponds to a first ACK/NACK hypothesis of the ACK/NACK hypothesis group 4-2→3-2→2-2, (BPSK '1', QPSK '10') is transmitted for (A,N,N,A) via ACK/NACK units #1 and #2 [Case 2 shown in FIG. 10].

Figure 11:
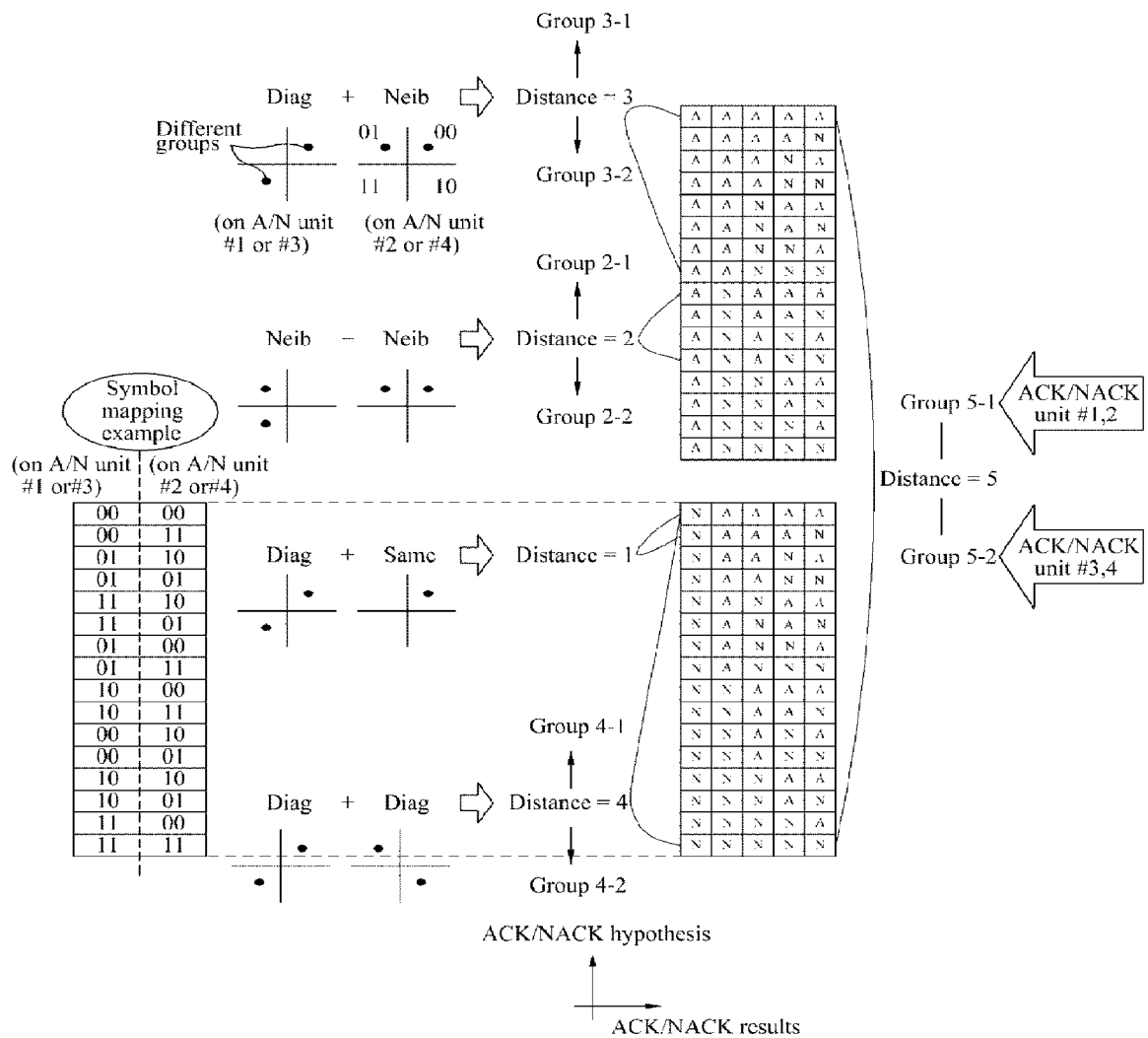
FIG. 11 shows an example for ACK/NACK multiplexing according to another embodiment of the present invention.

FIG. 11 shows an example for ACK/NACK multiplexing if $N_A$=4 and N=5 according to one embodiment of the present invention. To help the understanding of the present embodiment, the DTX case in ACK/NACK hypothesis is not taken into consideration. Yet, the present example is applicable to the case of including the DTX in the same manner.

Referring to FIG. 11, 32 ACK/NACK hypotheses are divided into 2 ACK/NACK hypothesis groups (Group 5-1 and Group 5-2). According to the present embodiment, the ACK/NACK hypothesis group 5-1 and the ACK/NACK hypothesis group 5-2 are divided to have a largest hamming distance '5' in-between. Subsequently, ACK/NACK units #1 and #2 and ACK/NACK units #3 and #4 are allocated to the ACK/NACK hypothesis group 5-1 and the ACK/NACK hypothesis group 5-2, respectively. Afterwards, 16 ACK/NACK hypotheses within an ACK/NACK hypothesis group 5-X (where, X=1, 2) are divided into 2 ACK/NACK hypothesis sub-groups (Group 4-1 and Group 4-2). According to the present example, a hamming distance between the ACK/NACK sub-groups 4-1 and 4-2 is set to 4. Moreover, 8 ACK/NACK hypotheses within an ACK/NACK hypothesis sub-group 4-X (where, X=1, 2) are divided into 2 ACK/NACK hypothesis sub-groups (Group 3-1 and Group 3-2). According to the present example, a hamming distance between the ACK/NACK hypothesis sub-groups 3-1 and 3-2 is set to 4. Similarly, 4 ACK/NACK hypotheses within an ACK/NACK hypothesis sub-group 3-X (where, X=1, 2) are divided into 2 ACK/NACK hypothesis sub-groups (Group 2-1 and Group 2-2). According to the present example, a hamming distance between the ACK/NACK hypothesis sub-groups 2-1 and 2-2 is set to 2.

According to the present embodiment, 2 QPSK symbols are transmitted via ACK/NACK unit pair. And, a combination of the 2 QPSK symbols is allocated to one of 16 ACK/NACK hypotheses within ACK/NACK hypothesis group 5-X (X=1, 2). Consequently, 32 ACK/NACK hypotheses are mapped to [combination of ACK/NACK units, combination of QPSK symbols]. In this case, a constellation distance between ACK/NACK hypotheses can be determined according to ACK/NACK hamming distance. Namely, in order to reduce worse ACK/NACK error situations, it is able to allocate the QPSK symbol combination in a manner that a larger constellation distance is provided to ACK/NACK hypotheses having a larger hamming distance.

For clarity, in the drawing, constellation points (e.g., QPSK symbol 00/11) in a diagonal direction among constellation points transmitted via the same ACK/NACK unit is represented as 'Diag (Diagonal)', neighboring constellation points (e.g., QPSK symbol 00/01) are represented as 'Neib (Neighbor)', and the same constellation points are represented as 'Same'. FIG. 11 shows an example for allocating a combination of constellation points for first and second ACK/NACK units is allocated in order of "Diag+Diag"→"Diag+Neib"→"Neib+Neib"→"Diag+Same" according to a decrease of he ACK/NACK hamming distance.

Figure 12:
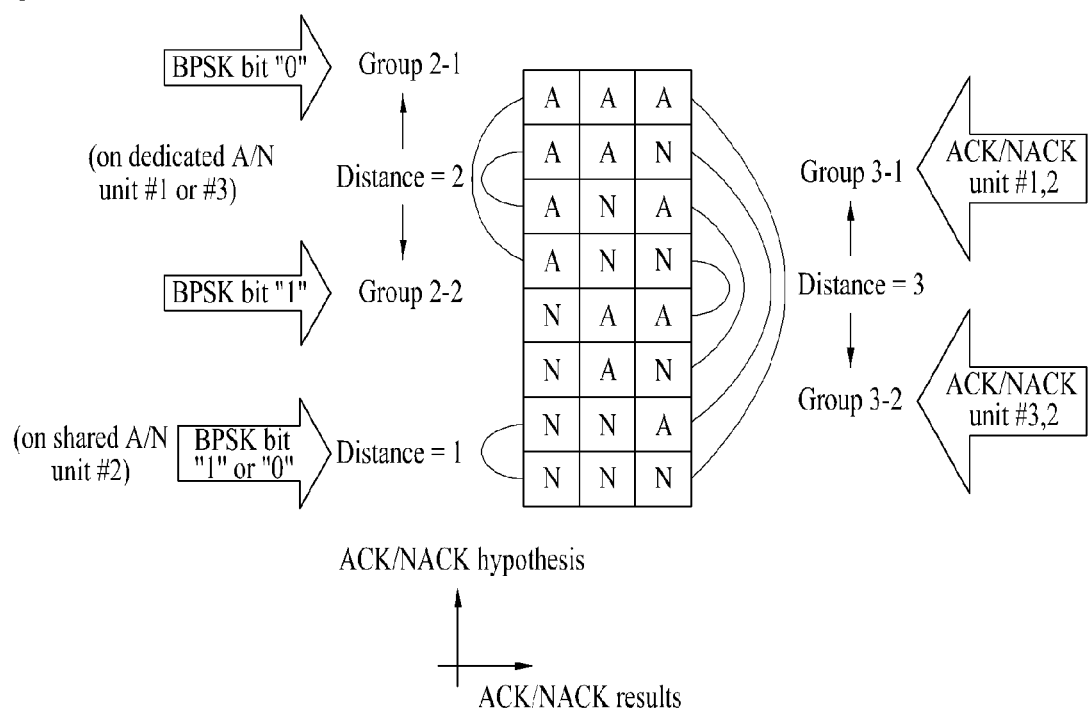
FIG. 12 shows an example for ACK/NACK multiplexing according to another embodiment of the present invention.

FIG. 12 shows an example for ACK/NACK multiplexing if '$N_A$=N=3' according to one embodiment of the present invention. To help the understanding of the present embodiment, the DTX case in ACK/NACK hypothesis is not taken into consideration. Yet, the present example is applicable to the case of including the DTX in the same manner. If the number $N_A$ of ACK/NACK units is odd, some of the ACK/NACK unit(s) in each ACK/NACK unit group can be shared over entire or partition ACK/NACK groups at least in part. In particular, entire ACK/NACK hypotheses can be transmitted via ACK/NACK unit group-dedicated ACK/NACK unit(s) and ACK/NACK unit group-shared ACK/NACK unit(s). In this case, the ACK/NACK unit group-dedicated ACK/NACK unit(s) is used by a specific ACK/NACK hypothesis group only, whereas the ACK/NACK unit group-shared ACK/NACK(s) is used by the entire ACK/NACK hypothesis groups. Hence, in order to determine a modulation symbol for the ACK/NACK hypothesis in each of the ACK/NACK hypothesis groups, [(dedicated or shared) ACK/NACK unit, modulation order, constellation point] should be selected. In this case, the [(dedicated or shared) ACK/NACK unit, modulation order, constellation point] can be selected in consideration of an error rate (e.g., a hamming distance) between the ACK/NACK hypotheses.

Referring to FIG. 12, first of all, 8 ACK/NACK hypotheses are divided into 2 ACK/NACK hypothesis groups (Group 3-1 and Group 3-2). According to the present example, the ACK/NACK hypothesis group 3-1 and the ACK/NACK hypothesis group 3-2 are divided to have a largest hamming distance '3' in-between. Subsequently, ACK/NACK units #1 and #2 and ACK/NACK units #3 and #4 are allocated to the ACK/NACK hypothesis group 3-1 and the ACK/NACK hypothesis group 3-2, respectively. In this case, the ACK/NACK units #1 and #3 are used by each of the ACK/NACK hypothesis groups only (i.e., ACK/NACK hypothesis group-dedicated ACK/NACK unit), whereas the ACK/NACK unit #2 is used in common to 2 ACK/NACK hypothesis groups (i.e., ACK/NACK hypothesis group-shared ACK/NACK unit). Moreover, 4 ACK/NACK hypotheses within an ACK/NACK hypothesis group 3-X (where, X=1, 2) are divided into 2 ACK/NACK hypothesis sub-groups (Group 2-1 and Group 2-2). According to the present example, a hamming distance between the ACK/NACK sub-groups 2-1 and 2-2 is set to 2. ACK/NACK hypothesis sub-group 2-X (X=1, 2) corresponds to one of BPSK bits {0, 1} and a corresponding BPSK bit value can be transmitted via ACK/NACK unit (i.e., ACK/NACK unit #1 or ACK/NACK unit #3) dedicated to the corresponding ACK/NACK hypothesis group.

Figure 13:
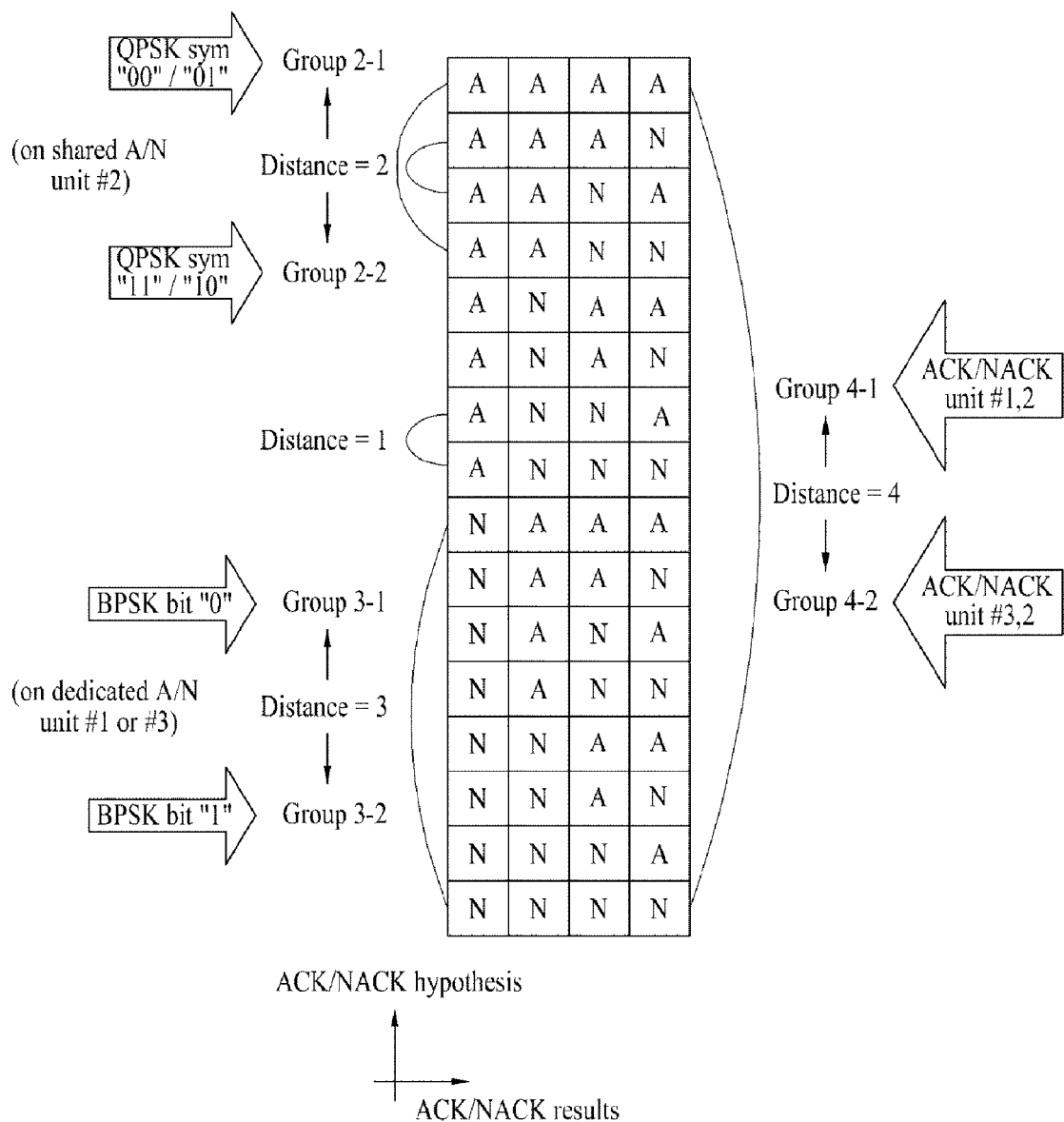
FIG. 13 shows an example for ACK/NACK multiplexing according to a further embodiment of the present invention.

FIG. 13 shows an example for ACK/NACK multiplexing if $N_A=3$ and N=4 according to a further embodiment of the present invention. To help the understanding of the present embodiment, the DTX case in ACK/NACK hypothesis is not taken into consideration. Yet, the present example is applicable to the case of including the DTX in the same manner.

Referring to FIG. 13, first of all, 16 ACK/NACK hypotheses are divided into 2 ACK/NACK hypothesis groups (Group 4-1 and Group 4-2). According to the present example, the ACK/NACK hypothesis group 4-1 and the ACK/NACK hypothesis group 4-2 are divided to have a largest hamming distance '4' in-between. Subsequently, ACK/NACK units #1 and #2 and ACK/NACK units #3 and #4 are allocated to the ACK/NACK hypothesis group 4-1 and the ACK/NACK hypothesis group 4-2, respectively. In this case, the ACK/NACK units #1 and #3 are used by each of the ACK/NACK hypothesis groups only (i.e., ACK/NACK hypothesis group-dedicated ACK/NACK unit), whereas the ACK/NACK unit #2 is used in common to 2 ACK/NACK hypothesis groups (i.e., ACK/NACK hypothesis group-shared ACK/NACK unit). Moreover, 8 ACK/NACK hypotheses within an ACK/NACK hypothesis group 4-X (where, X=1, 2) are divided into 2 ACK/NACK hypothesis sub-groups (Group 3-1 and Group 3-2). According to the present example, a hamming distance between the ACK/NACK sub-groups 3-1 and 3-2 is set to 3. ACK/NACK hypothesis sub-group 3-X (X=1, 2) corresponds to one of BPSK bits {0, 1} and a corresponding BPSK bit value can be transmitted via ACK/NACK unit (i.e., ACK/NACK unit #1 or ACK/NACK unit #3) dedicated to the corresponding ACK/NACK hypothesis group.

Finally, 4 ACK/NACK hypotheses within an ACK/NACK hypothesis group 3-X (where, X=1, 2) are divided into 2 ACK/NACK hypothesis sub-groups (Group 2-1 and Group 2-2). According to the present example, a hamming distance between the ACK/NACK sub-groups 2-1 and 2-2 is set to 2. Each ACK/NACK hypothesis subgroup 2-X (X=1, 2) corresponds to one of QPSK symbols pairs {00/01, 11/10} and a corresponding QPSK symbol value can be transmitted via the shared ACK/NACK unit (i.e., ACK/NACK unit #2). In this case, each QPSK symbol can be determined in a manner that 2 ACK/NACK hypotheses having a hamming distance set to 2 in-between can have a maximum distance in-between (e.g., QPSK symbol '00' and QPSK symbol '11').

Figure 14:
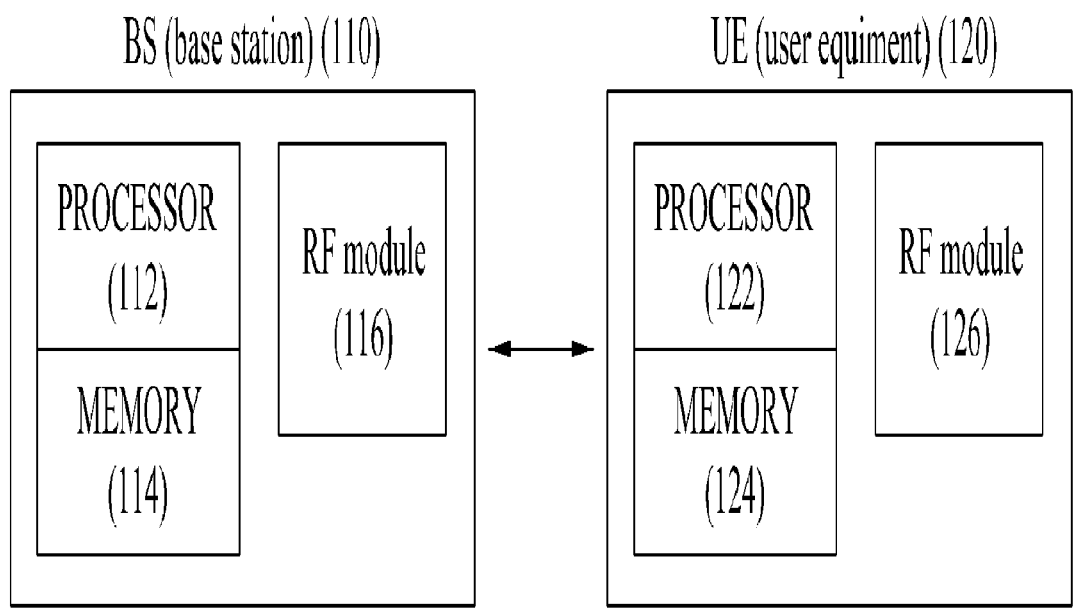
FIG. 14 is an exemplary diagram of a base station and user equipment applicable to an embodiment of the present invention.

FIG. 14 is a diagram illustrating a base station and a user equipment that can be applied to one embodiment of the present invention.

Referring to FIG. 14, the wireless communication system includes a base station (BS) 110 and a user equipment (UE) 120. In the downlink, the transmitter is a part of the base station 110 and the receiver is a part of the user equipment 120. In the uplink, the transmitter is a part of the user equipment 120 and the receiver is a part of the base station 110. The base station 110 includes a processor 112, a memory 114, and a radio frequency (RF) unit 116. The processor 112 can be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 can be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 can have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. More specifically, the present invention can be applied to a method and apparatus of ACK/NACK transmission.

The invention claimed is:

1. A method of transmitting acknowledgement (ACK)/negative acknowledgement (NACK) signals at a user equipment (UE) in a wireless communication system, the method comprising:
   receiving, by the UE, a plurality of data signals from a transmitting side, each data signal among the plurality of data signals requiring an ACK/NACK signal in response;
   determining, by the UE, a plurality of physical uplink control channel (PUCCH) resources for transmission of three or more ACK/NACK signals corresponding to the plurality of data signals, wherein the plurality of PUCCH resources are divided into a plurality of PUCCH resource groups,
   determining, by the UE, a PUCCH resource group among the plurality of PUCCH resource groups;
   obtaining, by the UE, at least two modulation symbols based on at least one modulation scheme including a binary phase shift keying (BPSK) and a quadrature phase shift keying (QPSK); and
   transmitting, by the UE, the obtained at least two modulation symbols to the transmitting side via at least two PUCCH resources within the determined PUCCH resource group, wherein the three or more ACK/NACK signals are multiplexed into the at least two PUCCH resources according to a mapping relation between the obtained at least two modulation symbols and the at least two PUCCH resources of the determined PUCCH resource group.

2. The method of claim 1, wherein each PUCCH resource group is configured in a manner that PUCCH resources are not overlapped between different PUCCH resource groups.

3. The method of claim 1, wherein at least one of the plurality of PUCCH resources is used in common over the plurality of PUCCH resource groups.

4. The method of claim 1, wherein the number of the plurality of PUCCH resources is smaller than the number of the plurality of data signals, and the number of the plurality of PUCCH resources is smaller than the number of three or more ACK/NACK signals.

5. The method of claim 1, wherein the plurality of PUCCH resource groups are determined such that a hamming distance between ACK/NACK hypotheses mapped to different PUCCH resource groups has a largest value.

6. The method of claim 1, wherein a modulation order and a constellation point for each of the at least two modulation symbols are independently determined per each PUCCH resource within the PUCCH resource group.

7. The method of claim 1, wherein the PUCCH resource group indicates an ACK/NACK hypothesis group including ACK or NACK for a particular data signal among entire ACK/NACK hypotheses, and wherein a [modulation symbol, PUCCH resource] pair within the PUCCH resource group indicates an ACK/NACK hypothesis subgroup including ACK/NACK for one or more remaining data signals except the particular data signal within the corresponding ACK/NACK hypothesis group.

8. A user equipment (UE) used in a wireless communication system, the UE comprising:
   a radio frequency (RF) unit configured to transceive a radio signal with a transmitting side; and
   a processor operatively connected to the RF unit, and configured to receive a plurality of data signals from a transmitting end, each data signal among the plurality of data signals requiring an ACK/NACK signal in response,
   determine a plurality of PUCCH (physical uplink control channel) resources for transmission of three or more ACK/NACK signals corresponding to the plurality of data signals, wherein the plurality of PUCCH resources are divided into a plurality of PUCCH resource groups
   determine a PUCCH resource group among the plurality of PUCCH resource groups,
   obtain at least two modulation symbols based on at least one modulation scheme including a binary phase shift keying (BPSK) and a quadrature phase shift keying (QPSK), and
   transmit the obtained at least two modulation symbols to the transmitting end via at least two PUCCH resources within the determined PUCCH resource group, wherein the three or more ACK/NACK signals are multiplexed into the at least two PUCCH resources according to a mapping relation between the obtained at least two modulation symbols and the at least two PUCCH resources of the determined PUCCH resource group.

9. The UE of claim 8, wherein each PUCCH resource group is configured in a manner that PUCCH resources are not overlapped between different PUCCH resource groups.

10. The UE of claim 8, wherein at least one of the plurality of PUCCH resources is used in common over the plurality of PUCCH resource groups.

11. The UE of claim 8, wherein the number of the plurality of PUCCH resources is smaller than the number of the plurality of data signals, and the number of the plurality of PUCCH resources is smaller than the number of three or more ACK/NACK signals.

12. The UE of claim 8, wherein the plurality of PUCCH resource groups are determined such that a hamming distance between ACK/NACK hypotheses mapped to different PUCCH resource groups has a largest value.

13. The UE of claim 8, wherein a modulation order and a constellation point for each of the at least two modulation symbols are independently determined per each PUCCH resource within the PUCCH resource group.

14. The UE of claim 8, wherein the PUCCH resource group indicates an ACK/NACK hypothesis group including ACK or NACK for a particular data signal among entire ACK/NACK hypotheses and wherein a [modulation symbol, PUCCH resource] pair within the PUCCH resource group indicates an ACK/NACK hypothesis subgroup including ACK/NACK for one or more remaining data signals except the particular data signal within the corresponding ACK/NACK hypothesis group.

15. The method of claim 1, wherein when the number of the plurality of data signals is 3, the mapping relation is determined by relations including the following table:

| ACK/NACK signals | | | PUCCH resource group | | PUCCH resource group | |
|---|---|---|---|---|---|---|
| | | | PUCCH resource #1 | PUCCH resource #2 | PUCCH resource #2 | PUCCH resource #3 |
| ACK | ACK | ACK | a | b | | |
| ACK | ACK | NACK | a | a | | |
| ACK | NACK | ACK | b | b | | |
| ACK | NACK | NACK | b | a | | |
| NACK | ACK | ACK | | | b | a |
| NACK | ACK | NACK | | | a | a |
| NACK | NACK | ACK | | | b | b |
| NACK | NACK | NACK | | | a | b | where a = 0 and b = 1, or a = 1 and b = 0.

16. The method of claim 1, wherein when the number of the plurality of data signals is 4, the mapping relation is determined by relations including the following table:

| ACK/NACK signals | | | | PUCCH resource group | | PUCCH resource group | |
|---|---|---|---|---|---|---|---|
| | | | | PUCCH resource #1 | PUCCH resource #2 | PUCCH resource #3 | PUCCH resource #4 |
| ACK | ACK | ACK | ACK | a | a, a | | |
| ACK | ACK | ACK | NACK | a | a, b | | |
| ACK | ACK | NACK | ACK | a | b, b | | |
| ACK | ACK | NACK | NACK | a | b, a | | |
| ACK | NACK | ACK | ACK | b | a, a | | |
| ACK | NACK | ACK | NACK | b | a, b | | |
| ACK | NACK | NACK | ACK | b | b, b | | |
| ACK | NACK | NACK | NACK | b | b, a | | |
| NACK | ACK | ACK | ACK | | | a | a, a |
| NACK | ACK | ACK | NACK | | | a | a, b |
| NACK | ACK | NACK | ACK | | | a | b, b |
| NACK | ACK | NACK | NACK | | | a | b, a |
| NACK | NACK | ACK | ACK | | | b | a, a |
| NACK | NACK | ACK | NACK | | | b | a, b |
| NACK | NACK | NACK | ACK | | | b | b, b |
| NACK | NACK | NACK | NACK | | | b | b, a | where a = 0 and b = 1, or a = 1 and b = 0.

17. The method of claim 8, wherein when the number of the plurality of data signals is 3, the mapping relation is determined by relations including the following table:

| ACK/NACK signals | | | PUCCH resource group | | PUCCH resource group | |
|---|---|---|---|---|---|---|
| | | | PUCCH resource #1 | PUCCH resource #2 | PUCCH resource #2 | PUCCH resource #3 |
| ACK | ACK | ACK | a | b | | |
| ACK | ACK | NACK | a | a | | |
| ACK | NACK | ACK | b | b | | |
| ACK | NACK | NACK | b | a | | |
| NACK | ACK | ACK | | | b | a |
| NACK | ACK | NACK | | | a | a |
| NACK | NACK | ACK | | | b | b |
| NACK | NACK | NACK | | | a | b | where a = 0 and b = 1, or a = 1 and b = 0.

18. The method of claim 8, wherein when the number of the plurality of data signals is 4, the mapping relation is determined by relations including the following table:

| ACK/NACK signals | | | | PUCCH resource group | | PUCCH resource group | |
|---|---|---|---|---|---|---|---|
| | | | | PUCCH resource #1 | PUCCH resource #2 | PUCCH resource #3 | PUCCH resource #4 |
| ACK | ACK | ACK | ACK | a | a, a | | |
| ACK | ACK | ACK | NACK | a | a, b | | |
| ACK | ACK | NACK | ACK | a | b, b | | |
| ACK | ACK | NACK | NACK | a | b, a | | |
| ACK | NACK | ACK | ACK | b | a, a | | |
| ACK | NACK | ACK | NACK | b | a, b | | |
| ACK | NACK | NACK | ACK | b | b, b | | |
| ACK | NACK | NACK | NACK | b | b, a | | |
| NACK | ACK | ACK | ACK | | | a | a, a |
| NACK | ACK | ACK | NACK | | | a | a, b |
| NACK | ACK | NACK | ACK | | | a | b, b |
| NACK | ACK | NACK | NACK | | | a | b, a |
| NACK | NACK | ACK | ACK | | | b | a, a |
| NACK | NACK | ACK | NACK | | | b | a, b |
| NACK | NACK | NACK | ACK | | | b | b, b |
| NACK | NACK | NACK | NACK | | | b | b, a | where a = 0 and b = 1, or a = 1 and b = 0.

* * * * *